Figure 1:
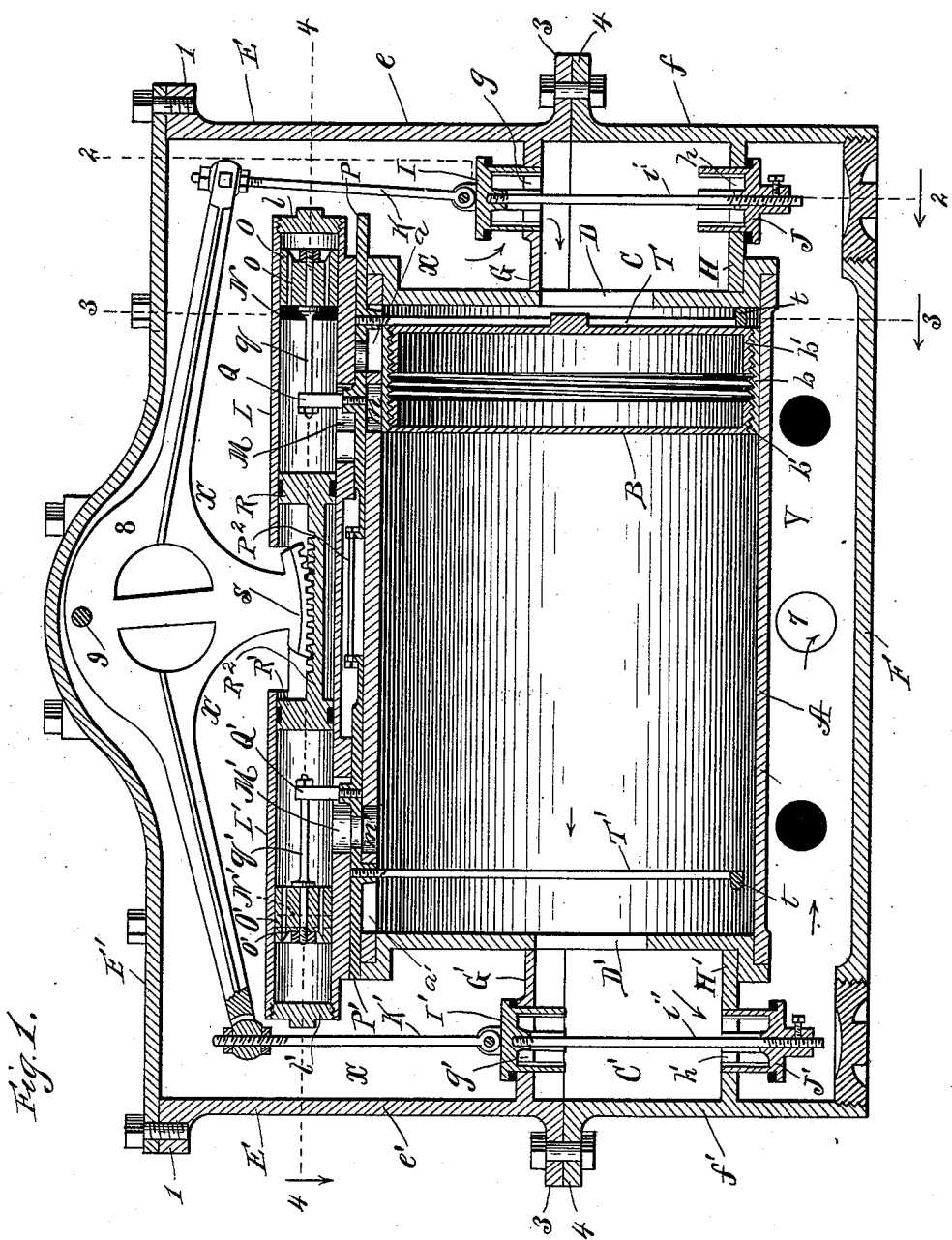

(No Model.) 3 Sheets—Sheet 1.
C. W. BECK.
METER FOR MEASURING LIQUIDS.

No. 541,522. Patented June 25, 1895.

Witnesses:
W. C. Corlies
Jno. A. Christianson.

Inventor:
Charles W. Beck
By Gidley & Hopkins
Atty's.

(No Model.) 3 Sheets—Sheet 2.
C. W. BECK.
METER FOR MEASURING LIQUIDS.
No. 541,522. Patented June 25, 1895.
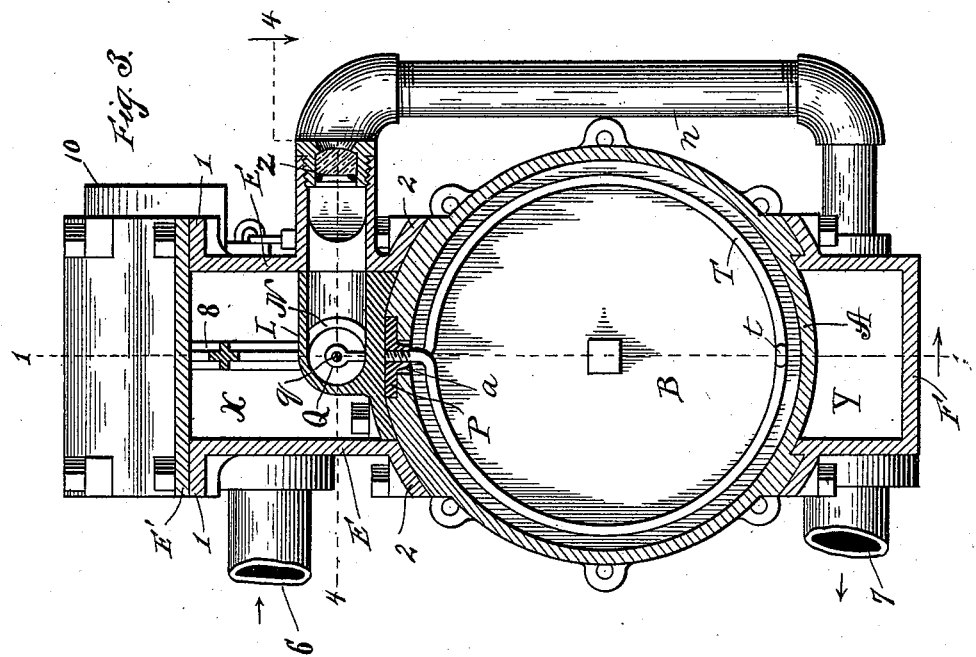
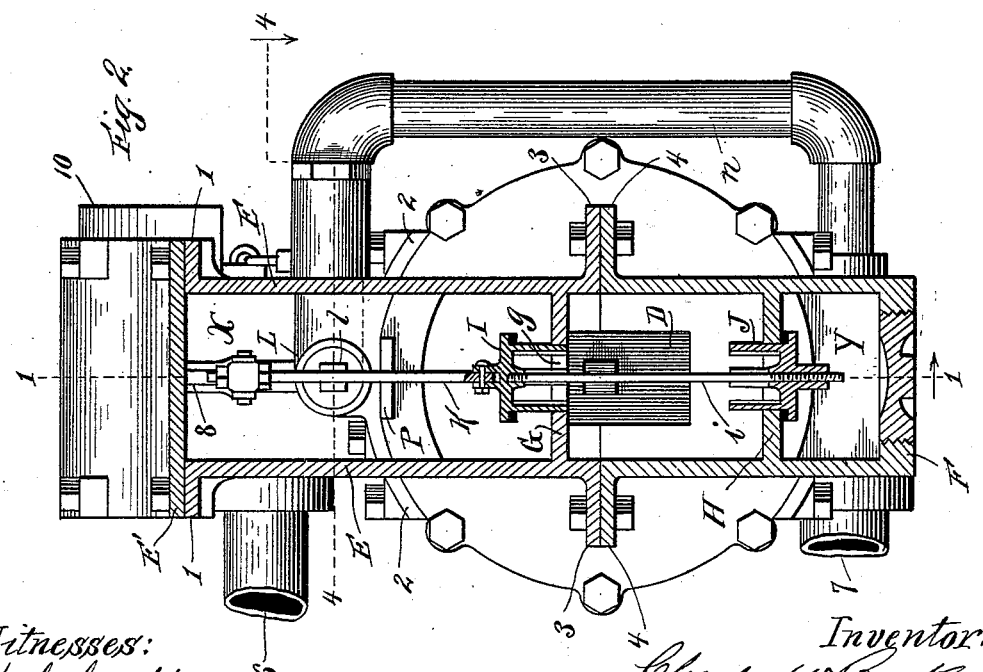
Witnesses:
W. C. Corlies
Jno. A. Christianson.
Inventor:
Charles W. Beck
By Gridley & Hopkins
Atty's.

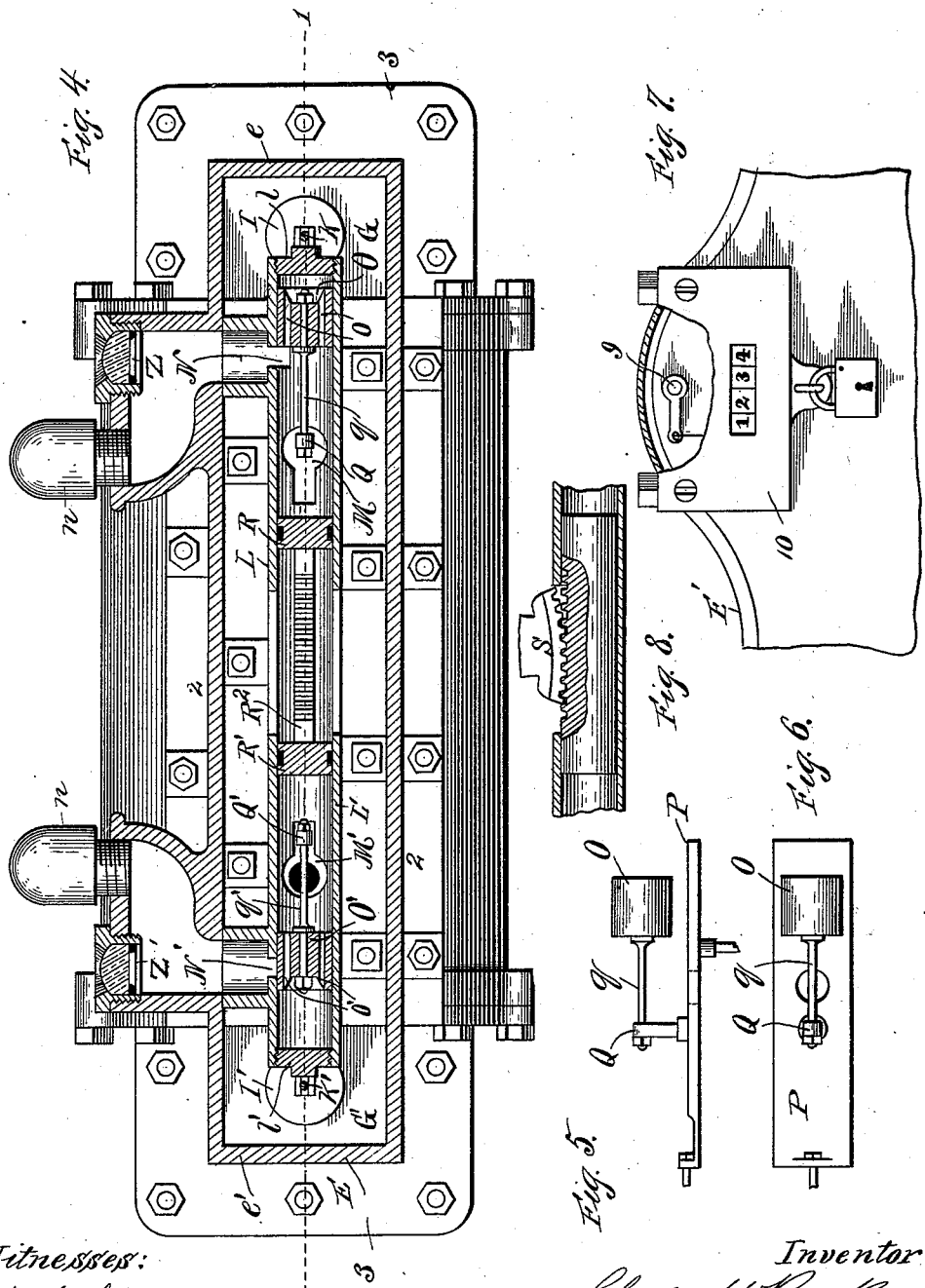

UNITED STATES PATENT OFFICE.

CHARLES W. BECK, OF CHICAGO, ILLINOIS.

METER FOR MEASURING LIQUIDS.

SPECIFICATION forming part of Letters Patent No. 541,522, dated June 25, 1895.

Application filed October 1, 1894. Serial No. 524,620. (No model.)

*To all whom it may concern:*

Be it known that I, CHARLES W. BECK, a citizen of the United States, residing at Chicago, in the county of Cook and State of Illinois, have invented certain new and useful Improvements in Meters for Measuring Liquids, of which the following is a specification, reference being had to the accompanying drawings, which are made a part hereof, and in which—

Figure 1 is a vertical longitudinal section of the improved meter on the line 1 1, Figs. 2, 3, and 4. Figs. 2 and 3 are vertical transverse sections thereof on the lines 2 2 and 3 3, respectively, Fig. 1. Fig. 4 is a horizontal section thereof on the line 4 4, Figs. 1, 2, and 3. Figs. 5 and 6 are respectively a side elevation and a plan view of a pair of valves hereinafter more fully described. Fig. 7 is an elevation of a fragment of the apparatus, showing the arrangement of the register. Fig. 8 is a sectional elevation showing a slight modification.

The present invention relates to that class of meters in which there is a cylinder, a piston arranged therein and adapted to be reciprocated by the force of the liquid entering the cylinder and suitable valves operating automatically at the completion of each stroke of the piston for reversing the flow of liquid through the cylinder and thereby reversing the stroke of the piston itself, a suitable register being coupled with some moving part for registering the number of strokes. In a meter of this class it is essential that the main valves, or those which control the flow of liquid into and out of the cylinder, be shifted from one position to another by a quick movement, else they will become balanced and permit the liquid to enter and leave both ends of the cylinder at once, and in this event the piston and other parts remain at rest and the object of the device is defeated.

One object of the present invention is to operate the main valves by the pressure of the liquid and at the same time operate them with a quick movement. I am aware that it has been proposed to operate the main valves by the direct pressure of the liquid against them, inequality in the pressure on opposite sides of them, and the "hammer" or momentum of the water at the completion of each stroke of the piston being depended upon for shifting them, but an apparatus constructed to operate under these conditions will be uncertain at best and with low or interrupted pressure will not operate at all.

Another object of the present invention may therefore be said to be the providing of a meter of the class referred to of such construction that its action will be certain and uniform under varying conditions of the pressure of the liquid passing through it, and other objects of the invention will appear hereinafter.

To these ends the invention consists in the features of novelty that are particularly pointed out in the claims hereinafter.

A represents the cylinder, and B the piston arranged therein, and fitted so that it can be moved by the liquid pressing against it and so that it will prevent said liquid from passing between it and the walls of the cylinder.

C and C' are a pair of chambers located one at each end of the cylinder and D D' are ample ports through which the cylinder and chambers communicate, so that the chambers are in effect extensions of the cylinder.

E is a hollow casting having a portion that rests upon the top of the cylinder, and portions $e$ and $e'$ that extend downward at the ends of the cylinder. The top of the casting is open and its upper margin is provided with a flange 1 for the reception of bolts by which the cover E' is secured in place. It is provided also with marginal flanges 2 for the reception of bolts by which it is secured to the top of the cylinder, and with flanges 3 for the reception of bolts by which the lower ends of its down-take portions $e$ and $e'$ are secured to similar flanges 4 on the upper ends of the up-take portions $f\ f'$, respectively, of a hollow casting F, the main portion of which extends from end to end of the cylinder and is provided with flanges 5 for the passage of bolts by which it is secured thereto. The lower ends of the down takes $e$ and $e'$ are closed by webs G and G', through which are formed ports $g$ and $g'$ respectively, which are in fact and in effect the main induction ports of the cylinder, although they do not open directly into the cylinder, but into the chambers C, C'. Within the uptakes $f, f'$ are webs H and H' that are provided with ports $h$ and $h'$, which are in fact and in effect the eduction ports of the cylinder, the webs H and H', and the webs G and G' being located a sufficient distance apart to result in the chambers C, C', aforesaid.

All of that space X which is inclosed by the casting E will hereinafter be called the induction chamber, because it is located on the induction side of the apparatus and the induction pipe 6 communicates with it, and all of that space Y which is inclosed by the casting F, excepting the chambers C, C', is hereinafter called the eduction chamber. With it communicates the eduction pipe 7 by which the liquid is carried off.

I, I' are puppet valves for controlling the induction ports $g$, $g'$, respectively.

J, J' are puppet valves for controlling the eduction ports $h$, $h'$, respectively.

$i$ is a rod rigidly connecting the valves I and J and $i'$ is a rod rigidly connecting the valves I' and J'.

K, K' are stems having their lower ends pivotally connected to the valves I and I', respectively, and having their upper ends pivotally connected to the opposite ends of a walking beam 8 which is located entirely within the induction chamber and is secured to a shaft 9, which extends out through openings in the side of the casing and is suitably connected, upon the outside of the casing with a register 10. I have not shown this register in detail because its construction forms no part of the present invention. A register of any desired construction may be used, and the manner of connecting it with the rock shaft 9 will readily suggest itself to a skilled mechanic.

It will be seen that by oscillating the beam the main valves will be so manipulated as to admit liquid to one end of the cylinder and permit it to escape from the other, and to shift the beam from one to the other of its two extreme positions at the end of each stroke of the piston, and do it quickly and by the pressure of the liquid in the apparatus, is the object of the mechanism hereinafter described.

The parts upon opposite sides of a line drawn transversely through the middle of the cylinder being of similar construction it will be sufficient for the purposes of this part of this specification if the description be confined to one set of said parts, similar parts in both sets being indicated by similar reference letters and numerals, but for the sake of distinction the prime mark is added to the letters used on the parts of one set.

L is a pipe or cylinder closed at its outer end, preferably by means of a screw plug $l$. In the sides of this cylinder are two ports,—an induction port M, which registers with a port $m$ in the side of the main cylinder A and an eduction port N which communicates by a pipe $n$ with the eduction chamber Y.

O is a sliding plug valve located in the cylinder and adapted to control the eduction port N and $o$ is a passage or duct formed through said valve for permitting the water to pass from one side of it to the other as it is moved back and forth in the cylinder; so as to avoid cushioning it.

P is a slide valve located in a recess between the cylinders A and L, and adapted to control the ports M and $m$.

The valves O and P are connected, so that they move in unison, by means of a post Q which projects laterally from the valve P, through the port M and into the cylinder L, and a rod $q$ which is rigidly connected at one end to the post Q and at the other to the valve O.

The ports M and N and the valves O and P and their connections are so constructed and arranged that the valve P completely closes the port M before the valve O begins to uncover port N and the port $m$ and piston B are preferably so related that when the piston is at the end of its stroke the port is still closed by it.

In the cylinder L is a piston R which is packed so as to prevent the liquid in the induction chamber X, which is constantly pressing against it, from passing it and entering the cylinder.

To the valve P is secured a rod or tappet T which projects into the cylinder A through a slot $a$ formed in the side thereof, said rod or tappet being preferably continued in the form of a complete ring as shown more clearly by Fig. 3, and provided at bottom with a lug $t$ for a purpose that will appear presently.

The valves P and P' are connected rigidly by means of a rod P² and the pistons R and R' are connected rigidly by means of a bar R² having its top side toothed to form a rack with which meshes a toothed segment S carried at the lower end of an arm which projects downward from the center of the walking beam 8. In order to prevent the rack bar R² from turning and thereby throwing it out of gear with the segment, said bar is made to join the pistons R, R' below their centers.

Z, Z' are peek-holes arranged opposite the ports N, N' respectively, for the purpose of watching the action of the valves.

I prefer to regard the parts L, L' as a two-part cylinder and to regard the parts R, R' R² as a single piston, rather than regard them as two separate cylinders and two separate pistons, and if desired they may be constructed as shown in Fig. 8, where each is in fact only a single integral member.

This completes the description of the construction of the improved meter, the operation of which is as follows: As the parts are shown in the drawings, the induction valve I and eduction valve J' have just been opened, the induction valve I' and eduction valve J have just been closed, and the piston has just commenced its stroke in the direction of the arrow upon it—to the left. During the movement of the piston in this direction, and until it strikes the tappet T' none of the other parts change their positions. As soon, however, as the piston comes against this tappet the valves O, O', P and P' all partake of its movement and move with it until it completes its stroke, the passages through the valves O and O' making it possible for them to move without displacing any liquid from either end of the cylinder, both of which are at this time closed. The arrangement of the ports M, 'M' and valves P, P', is such that as P begins to uncover M, P' begins to cover M', but this does not take place until O has completely covered N, else liquid would flow through m—M into L and out through N to the eduction chamber. The complete closing of M' by P' is however not necessary at this stage, because the piston B is covering m' and thus water is excluded from L'. By the time P' has completely closed M', P has completely opened M, and the induction valve I being still open it follows that the liquid in L is under the same pressure as that in the induction chamber X, and there being no pressure in L' and the pressure against the piston R—R' being balanced, it follows that there will be a preponderance of pressure against the end R of the piston R—R' toward the left, due to the pressure in L; but this pressure cannot move the piston R—R' because of the liquid confined in the end L' of the cylinder until the meter piston A has proceeded far enough to uncover the eduction port N'. Then the pressure in L will force the piston R—R' toward the left with a quick movement, expelling the liquid from L' through N' and the rack-bar $R^2$ meshing with the segment S will shift the position of the walking beam and thereby shift the positions of the main valves of the cylinder A, opening I' and J and closing I and J'. When the piston completes its stroke to the right a similar action takes place.

The piston is hollow and is constructed of a ring or short cylinder $b$, interiorly screw threaded and two heads or caps $b'$ exteriorly screw threaded and screwed into the ring. The advantage of a hollow piston is that it has a buoyancy which lessens the friction between it and the cylinder, and this and other features of the invention are useful in pumps, &c.

Having thus described my invention, the following is what I claim as new therein and desire to secure by Letters Patent:

1. In a liquid meter, the combination with the cylinder, the piston, the induction and eduction ports, and valves controlling said ports, of a hydraulic motor speed-multiplying gearing for transmitting motion from the motor piston to the meter valve, and means operated by the meter-piston for conditioning said motor to operate and shift the valves at the completion of each stroke of the meter-piston, substantially as set forth.

2. In a liquid meter, the combination with the cylinder, the piston, the induction and eduction ports, valves controlling said ports, and gearing including a walking beam connecting said valves, of a hydraulic motor suitably connected with the valve-mechanism for operating the valves, said motor having a cylinder provided with induction and eduction ports, a piston in said cylinder, and means controlled by the meter-piston for admitting liquid to the motor cylinder upon one side of its piston and for confining the liquid in the motor cylinder upon the other side of its piston, until the meter piston has about completed its stroke, substantially as set forth.

3. In a liquid meter, the combination with the cylinder, the piston, the induction and eduction ports, valves controlling said ports, and gearing connecting said valves, of a hydraulic motor suitably connected with the valve mechanism for operating the valves, said motor having a cylinder provided at each end with an induction port communicating with the meter cylinder and an eduction port communicating with the outlet, a piston located in said cylinder, between said ports, valves for controlling all of said ports, means connecting said valves so that they move together and so that when the induction port at one end of the cylinder is open, its eduction port is closed, and means operated by the meter-piston for opening the induction port at one end of the cylinder and keeping both ports at the other end of the cylinder closed until the meter-piston is about to complete its stroke and then opening the eduction port of said other end of the cylinder, substantially as set forth.

4. In a liquid meter, the combination with the cylinder, the piston, the induction and eduction ports, valves controlling said ports, and gearing connecting said valves, of a hydraulic motor suitably connected with the valve mechanism for operating the valves, said motor having a cylinder having at each end an induction port communicating with the meter cylinder, and an eduction port communicating with the outlet, a piston in said cylinder, valves controlling all of said ports, means connecting said valves so that when any port is open the other port of the same name is closed, and so that when either eduction port is open the induction port at the same end of the cylinder is closed, and means engaged by the meter piston for shifting said valves at each stroke of the meter-piston, substantially as set forth.

5. In a liquid meter, the combination with the cylinder and piston, the induction and eduction ports, valves controlling said ports, and gearing connecting said valves, of a hydraulic motor connected with the valve-mechanism for operating the valves, said motor having suitable valves, and a pair of tappets connected with said valves, said tappets being constructed in the form of rings and arranged in the path of the piston, one near each end of the cylinder, substantially as set forth.

6. In a water meter, the combination with the cylinder and piston, the induction and eduction ports, valves controlling said ports, and a walking beam connected with said valves, of a hydraulic motor for oscillating said beam, and thereby operating the valves, said motor having a cylinder, having induction and eduction ports, valves controlling said ports, means for controlling said valves, and a piston arranged in the motor cylinder, the walking beam having an arm extending from its middle portion and engaging the motor piston, and the motor cylinder being cut away to permit said engagement, substantially as set forth.

7. In a water meter, the combination with the cylinder and piston, the induction and eduction ports, valves controlling said ports and a walking beam connected with said valves, of a hydraulic motor for oscillating said beam, and thereby operating the valves, said motor having induction and eduction ports, valves controlling said ports, means for controlling said valves, a piston in the motor cylinder, a rack carried by said piston, and an arm projecting from the middle of the walking beam and having a toothed segment engaging said rack, the cylinder being cut away to permit the engagement, substantially as set forth.

CHARLES W. BECK.

Witnesses:
L. M. HOPKINS,
J. HALPENNY.